United States Patent [19]

DuLaney et al.

[11] Patent Number: 4,595,415

[45] Date of Patent: Jun. 17, 1986

[54] DRIER CATALYST FOR COATING COMPOSITIONS

[75] Inventors: Donald C. DuLaney; Robert H. Lindsay, both of Madison, Wis.

[73] Assignee: Lindsay Finishes, Inc., Madison, Wis.

[21] Appl. No.: 674,164

[22] Filed: Nov. 23, 1984

[51] Int. Cl.$^4$ .......................... C09D 3/26; C09F 9/00
[52] U.S. Cl. .................................. 106/264; 106/310
[58] Field of Search ............................... 106/264, 310

[56] References Cited

U.S. PATENT DOCUMENTS 3,467,683  9/1969  Harson et al. ..................... 106/310
3,719,622  3/1973  Holzinger ........................... 106/264

FOREIGN PATENT DOCUMENTS 0067582  12/1982  European Pat. Off. .
2039268   8/1980  United Kingdom .
1596410   8/1981  United Kingdom .

OTHER PUBLICATIONS

Chem. Abst., 57:6060, W. H. Canty et al, 1959.
Chem. Abst., 88:55604x, Sekine et al., 1977.
Canty et al, "1,10-Phenanthroline-Drier Catalyst Activity in Organic Coatings", *Ind. & Eng. Chem.*, vol. 52, pp. 67-70 (Jan. 1960).
Canty et al, "1,10-Phenanthroline Promotes Drying of Paints", *Paint Industry* (Apr. 1960).
Cyanamid "Phosphine Chemicals" brochure—American Cyanamid Company (undated).

*Primary Examiner*—Theodore Morris
*Attorney, Agent, or Firm*—Wood, Dalton, Phillips, Mason & Rowe

[57] ABSTRACT

A drier catalyst for use in coating compositions which contain polyunsaturated oils comprises a coordination complex of tri n-octylphosphine oxide and the manganese salt of a hydrocarbon-soluble carboxylic acid, such as octoic acid. The catalyst is unaffected by the presence of zinc compounds or iron in the coating composition.

18 Claims, No Drawings

DRIER CATALYST FOR COATING COMPOSITIONS

BACKGROUND OF THE INVENTION

1. Field of the Invention

This invention relates generally to drier catalysts for use in coating compositions and, more particularly, this invention relates to the use of an organic coordination complex of a manganese salt as a drier catalyst in oleoresinous coating compositions.

2. Description of the Prior Art

The use of various metal salts, such as salts of cobalt, zirconium, calcium and manganese, for example, as so-called "drier catalysts" in coating compositions is well known. Such drier catalysts promote the oxidative polymerization of the polyunsaturated oils in the composition after application in order to effect drying.

It is known that some coordination complexes of drier metals are more effective as oxidative catalysts than are the uncomplexed metal ions. For example, 1,10-phenanthroline forms coordination complexes with many metals, especially with manganese and cobalt, whereby the activity and stability or the metal is increased. See, for example, Canty et al, "1,10-Phenanthroline Promotes Drying of Paints" in *Paint Industry* (April 1960) and Canty et al, "1,10-Phenanthroline-Drier Catalyst Activity in Organic Coatings", *Ind. & Eng. Chem.*, Volume 52, pages 67–70 (January 1960).

While useful, prior drier metal complexes exhibit several disadvantages. For example, 1,10 phenanthroline is quite costly, and, perhaps more importantly, is not effective in the presence of zinc oxide or zinc salts. Zinc oxide is frequently used in paints to prevent the growth of mildew, to improve color retention and, usually in conjunction with zinc chromate, zinc phosphate or zinc dust, to improve corrosion resistance.

Furthermore, 1,10-phenanthroline is a specific indicator for iron ions in concentrations as low as several ppm. At the acidic pH levels of resins and oils used in paints, 1,10-phenanthroline turns pink in the presence of a few ppm of iron and, since iron is frequently found in trace quantities in coating compositions, the use of 1,10-phenanthroline in the composition tends to turn the composition pink. This is a particular problem in water based paints, because any exposure thereof to uncoated steel will result in some pickup of iron ions from the environment.

SUMMARY OF THE INVENTION

It is an object of the invention to overcome one or more of the problems described above.

According to the present invention, a coordination complex of tri n-octylphosphine oxide (sometimes referred to herein as "TOPO") and a manganese salt of a hydrocarbon soluble carboxylic acid is used as an oxidative polymerization catalyst in oleoresinous coating compositions. The carboxylic acid is preferably octoic acid, naphthenic acid or tallate acid.

The invention also comprehends a solution of the coordination complex and an aromatic hydrocarbon solvent which is suitable for introduction to coating compositions.

The inventive chelate is effective in the presence of zinc oxide and zinc salts, and is not affected by the presence of iron.

Other objects and advantages of the invention will be apparent from the following detailed description, taken in conjunction with the appended claims.

DETAILED DESCRIPTION OF THE INVENTION

The drier catalyst of the invention is useful in any paint or other coating composition which incorporates a polyunsaturated oil, such as vegetable oil, as a component of the system. Such compositions include, without limitation, coatings based on solutions of oleoresinous binders in organic solvents, coatings based on emulsions or solutions of oleoresinous binders in water, and coatings based on oleoresinous modified latex in water. Typical coatings include flat house paints, gloss house paints, water-borne alkyd enamels, acrylic latex house paint and alkyd enamels. The catalyst may also be incorporated into a preprepared alkyd modifier for use in latex paints.

The function of the catalyst is to promote the oxidative polymerization of the unsaturated oils which are present in the coating compositions, thereby forming a solid film (as opposed to a liquid film) in a manner within the time span which is typically referred to as "drying" by those skilled in the art of formulating coating compositions.

As set forth above, the catalyst comprises a coordination complex of tri n-octylphosphine oxide (an organic chelating agent) and the manganese salt of a hydrocarbon soluble carboxylic acid.

The chelating agent, tri n-octylphosphine oxide ("TOPO"), is an organophosphorus compound which is soluble in commonly used aliphatic and aromatic solvents. TOPO is a waxy solid at room temperature. In order to obtain a concentration of TOPO suitable for normal use in coating compositions, the TOPO should be dissolved in a solvent which comprises at least about 30 wt. % of an aromatic hydrocarbon. If desired, higher levels, up to 100%, of the aromatic solvent may be used.

For example, 100% of a so-called "heavy aromatic solvent" may be used, as may 100% xylol, or a mixture of xylol and another solvent, such as mineral spirits.

The choice of carboxylic acid used in the manganese salt is not critical, although the acid should be hydrocarbon soluble. Preferred acids are octoic acid, naphthenic acid and tallate acid.

Methods of preparation of the manganese salts of such acids are well known to those skilled in the art, and such salts are readily commercially available.

The catalyic coordination complex of the invention may be readily prepared by simple mixing of the TOPO and the manganese salt in the presence of a suitable aromatic solvent. It is preferred to prepare the chelate in advance of addition to the coating composition to ensure that the chelate is properly formed. This is especially true when there are competing metal ions present in the paint formula. If there are no such competing metal ions present in the composition, the manganese salt and the TOPO may be added separately to the coating composition.

Preferably, the concentration in the coating composition of manganese metal present in the catalyst should be at least 0.02 wt. %, based on the total weight of resin and oil solids present in the composition. If desired, a higher catalyst concentration may be used, but higher concentrations are less cost effective. Also, lower concentrations may be used, but a decrease in manganese concentration to less than about 0.02 wt. % results in poorer drying characteristics of the composition.

In order to formulate a coating composition with the desired manganese metal concentration, it is convenient to prepare a solution of the chelate having a standard manganese concentration, such as about 2.0 wt. %, for example.

In this regard, it is noted that manganese salts of the preferred octoic acid, naphthenic acid, or tallate acid are conventionally available in metal concentrations of 6, 12 or 18 wt. %.

In order to obtain a chelate solution having a 2.0 wt. % concentration of manganese, it is necessary to use a 16.65 wt. % solution of a manganese salt which is 12% metal. Accordingly, a solution comprising 33.3 wt. % of the 6% metal salt will provide a 2.0 wt. % solution, and an 11.1 wt. % solution of 18% manganese salt will provide such a solution.

EXAMPLES

The following specific Examples illustrate various embodiments of the invention and are not to be considered as limiting in any way. In the Examples, all parts are by weight.

EXAMPLE 1

A preferred embodiment of a solution of the catalyst of the invention is prepared by mixing 47.50 parts of TOPO, 35.85 parts of heavy aromatic solvent, and 16.65 parts of 12% manganese octoate for a total of 100 parts. This solution has a manganese metal concentration of 2.0 wt. %.

EXAMPLE 2

A second preferred embodiment of a solution of the catalyst of the invention is prepared by mixing 47.50 parts of TOPO, 16.65 parts of 12% manganese octoate, 14.75 parts of xylol, and 21.10 parts of mineral spirits, for a total of 100 parts. This solution also has a manganese metal concentration of 2.0 wt. %.

EXAMPLES 3–8

The following specific Examples illustrate various paints and enamels incorporating the catalyst solution of either of Examples 1 or 2.

EXAMPLE 3

A flat house paint is prepared by mixing the following ingredients in the indicated proportions:

| | |
|---|---|
| Long Oil Alkyd (70% NVM)* | 240.0 |
| Castor Wax | 8.0 |
| Organo Montmorillonite Clay | 5.0 |
| Mineral Spirits | 237.1 |
| Heat Bodied Linseed Oil (80% NVM) | 55.0 |
| Heat Bodied Linseed/Tung Oil (54% NVM) | 43.7 |
| Raw Linseed Oil | 27.1 |
| Fungicide | 10.0 |
| Methyl Ethyl Ketoxime | 1.9 |
| Titanium Dioxide | 225.0 |
| Calcium Carbonate | 40.0 |
| Magnesium Silicate | 50.0 |
| Mica | 50.0 |
| Diatomaceous Silica | 100.0 |
| Catalyst Solution | 2.6 |

*Nonvolatile matter

EXAMPLE 4

A gloss house paint is prepared by mixing the following ingredients in the indicated proportions:

| | |
|---|---|
| Long Oil Alkyd (70% NVM) | 292.0 |
| Castor Wax | 2.0 |
| Heat Bodied Linseed Oil (80% NVM) | 80.0 |
| Heat Bodied Linseed/Tung Oil (54% NVM) | 21.8 |
| Mineral Spirits | 97.8 |
| Organo Montmorillonite Clay | 5.0 |
| Methyl Ethyl Ketoxime | 1.0 |
| Titanium Dioxide | 250.0 |
| Zinc Oxide | 100.0 |
| Calcium Carbonate | 250.0 |
| Alkali Refined Linseed Oil | 124.0 |
| Catalyst Solution | 4.0 |

EXAMPLE 5

A water borne alkyd enamel house paint is prepared by mixing the following ingredients in the indicated proportions:

| | |
|---|---|
| Kelsol 3922 (80% NVM) | 267.5 |
| Triethylamine | 7.5 |
| Long Oil Alkyd (100% NVM) | 12.0 |
| Propoxy Propanol | 26.7 |
| Defoamer | 5.1 |
| Water | 460.4 |
| ASE-60 | 13.1 |
| 28% Ammonia | 9.4 |
| Titanium Dioxide | 275.0 |
| Catalyst Solution | 2.3 |

EXAMPLE 6

A alkyd modifier for use in latex paints is prepared by mixing the following ingredients in the indicated proportions:

| | |
|---|---|
| Long Oil Alkyd (100% NVM) | 210.0 |
| Catalyst Solution | 2.1 |
| Non-Ionic Surfactant | 2.3 |
| Defoamer | 1.0 |

EXAMPLE 7

An acrylic latex house paint is prepared utilizing the prepared alkyd modifier of Example 6 by mixing with the following ingredients in the indicated proportions:

| | |
|---|---|
| Water | 125.0 |
| Acrylic Emulsion (50% NVM) | 431.2 |
| Propylene Glycol | 121.0 |
| Coalescing Solvent | 16.0 |
| Anionic Dispersant | 10.3 |
| Nonionic Surfactant | 3.3 |
| Methyl Cellulose | 2.8 |
| Defoamer | 1.0 |
| Fungicide | 5.0 |
| Package Preservative | 1.8 |
| Titanium Dioxide | 275.0 |
| Prepared Alkyd Modifier (Example 6) | 38.0 |

EXAMPLE 8

An alkyd enamel is prepared by mixing the catalyst solution of Examples 1 or 2 with the following ingredients in the indicated proportions:

| | |
|---|---|
| Medium Length Alkyd (50% NVM) | 505.8 |
| Long Oil Alkyd (100% NVM) | 24.0 |
| Castor Wax | 2.0 |
| Organo Montmorillonite Clay | 8.0 |
| Soya Lecithin | 4.3 |
| Mineral Spirits | 143.3 |
| Methyl Ethyl Ketoxime | 1.9 |
| Titanium Dioxide | 250.0 |
| Catalyst Solution | 2.8 |

From the foregoing, it will be appreciated by those skilled in the art that the inventive drier catalyst is useful in any of a wide variety of polyunsaturated oil containing coating compositions, is useful in the presence of zinc compounds such as zinc salts or zinc oxide and is unaffected by the presence of iron in the coating composition. The catalyst is economical, is simple to prepare and provides excellent drying promotion activity.

The foregoing detailed description is given for clearness of understanding only, and no unnecessary limitations should be inferred therefrom, as modifications within the scope of the invention will be obvious to those skilled in the art.

We claim:

1. In a coating composition comprising one or more polyunsaturated oils, the improvement wherein said composition further includes an effective amount of an oxidative catalyst which comprises a hydrocarbon-soluble coordination complex of tri n-octylphosphine oxide and a manganese salt of a hydrocarbon soluble carboxylic acid.

2. The improvement of claim 1 wherein said carboxylic acid is selected from the group consisting of octoic acid, naphthenic acid and tallate acid, or mixtures.

3. The improvement of claim 1 wherein said oil comprises vegetable oil.

4. The improvement of claim 1 wherein said coating composition comprises a sufficient amount of an aromatic hydrocarbon solvent to solubilize said coordination complex.

5. The improvement of claim 1 wherein the manganese present in said chelate comprises at least about 0.02 wt. % of the total weight of resin and oil solids present in said composition.

6. The improvement of claim 1 wherein said composition further comprises zinc oxide or a zinc salt.

7. The improvement of claim 1 wherein said composition further comprises at least trace amounts of iron.

8. A coating composition comprising a polyunsaturated vegetable oil and a catalytically effective amount of a coordination complex of tri n-octylphosphine oxide and the manganese salt of a hydrocarbon soluble carboxylic acid selected from the group consisting of octoic acid, naphthenic acid and tallate acid, or mixtures thereof.

9. The composition of claim 8 wherein the concentration in said composition of the manganese of said complex is at least about 0.02 wt. %, based on the total weight of resin and oil solids in said composition.

10. The composition of claim 8 further comprising zinc oxide or a zinc salt.

11. The composition of claim 8 further comprising at least trace amounts of iron.

12. A solution of an oxidative catalyst useful in polyunsaturated oil-containing coating compositions, said solution comprising a hydrocarbon solvent which comprises at least about 30 wt. % of an aromatic hydrocarbon, and a coordination complex of tri n-octylphosphine oxide and a manganese salt of a hydrocarbon soluble carboxylic acid.

13. The solution of claim 12 wherein said carboxylic acid is selected from the group consisting of octoic acid, naphthenic acid and tallate acid.

14. The solution of claim 12 wherein said solvent comprises between about 30 and 100 wt. % of an aromatic hydrocarbon.

15. The solution of claim 14 wherein said solvent consists essentially of xylol.

16. The solution of claim 14 wherein said solvent comprises a mixture of xylol and mineral spirits.

17. An oxidative catalyst useful in polyunsaturated oil-containing coating compositions, said catalyst comprising a coordination complex of tri n-octylphosphine oxide and a manganese salt of a hydrocarbon soluble carboxylic acid.

18. The catalyst of claim 17 wherein said carboxylic acid is selected from the group consisting of octoic acid, naphthenic acid and tallate acid.

* * * * *